United States Patent [19]

Dörfel et al.

[11] 4,310,483

[45] Jan. 12, 1982

[54] THERMAL TUMBLING GRANULATION

[75] Inventors: Werner H. Dörfel, Reinach; Bernhard Medinger, Aesch; Eduard Troxler, Basel, all of Switzerland

[73] Assignee: Ciba-Geigy Corporation, Ardsley, N.Y.

[21] Appl. No.: 63,233

[22] Filed: Aug. 3, 1979

[30] Foreign Application Priority Data

Aug. 15, 1978 [CH] Switzerland .......................... 8677/78

[51] Int. Cl.³ .................................................. C08J 3/00
[52] U.S. Cl. ....................................... 264/117; 264/310; 106/297; 106/300; 106/304; 106/307; 106/308 Q; 106/308 F; 106/308 M
[58] Field of Search ............... 106/218, 308 Q, 272, 106/298, 300, 304, 308 F, 307, 308 M; 260/42.56; 264/117, 310

[56] References Cited

U.S. PATENT DOCUMENTS

| | | | |
|---|---|---|---|
| 3,318,538 | 5/1967 | Needham | 241/178 |
| 3,674,736 | 7/1972 | Lerman et al. | 106/308 Q |
| 3,694,402 | 9/1972 | Maltby | 260/42.56 |
| 3,778,288 | 12/1973 | Ridge et al. | 106/272 |
| 3,909,472 | 9/1975 | Fischer et al. | 106/272 |
| 4,154,622 | 5/1979 | Momoi et al. | 106/308 Q |
| 4,170,487 | 10/1979 | Robertson | 106/308 Q |

FOREIGN PATENT DOCUMENTS

| | | | |
|---|---|---|---|
| 1178847 | 1/1970 | United Kingdom . | |
| 1434085 | 4/1976 | United Kingdom | 260/42.56 |

*Primary Examiner*—Allan Lieberman
*Assistant Examiner*—Patricia Short
*Attorney, Agent, or Firm*—Luther A. R. Hall

[57] ABSTRACT

A process for producing a granulate of difficultly fusible additives for plastics, particularly of pigments, by thermal tumbling granulation, which process comprises mixing the additive in powder form with a granulating auxiliary which softens between 30° and 200° C. and which has a particle size of 0.1–2.0 mm; and subjecting this mixture to a gentle rotary motion, with heating by means of a source of heat being simultaneously applied at least until softening of the granulating auxiliary commences.

9 Claims, No Drawings

THERMAL TUMBLING GRANULATION

The present invention relates to a process for the thermal tumbling granulation, under gentle conditions, of difficultly fusible additives for plastics.

Processes for producing granulates of difficultly fusible additives for plastics are known from the German Pat. Specifications Nos. 1,542,058 and 1,642,990 and from the U.S. Pat. No. 3,778,288. Fairly high temperatures are generated in these processes by means of high-speed stirring and mixing apparatus, so that one constituent of the mixture being mixed melts and acts as a granulating liquid. As a result of the forces being exerted in high-speed mixing processes, the formation of agglomerates is affected in such a manner that the dispersibility of the granulate thus obtained is to a considerable extent impaired, and this has a disadvantageous effect particularly in the case of pigments. A satisfactory dispersibility can indeed be achieved in particular cases by using large amounts of a granulating auxiliary possibly together with dispersing agents. However, in most cases larger proportions of these additives are undesirable if the product is to be used for pigmenting any substrate, for substrates in general are able to absorb only a small amount of foreign substance before a change in their physical properties occurs.

There is known from the German Offenlegungschrift No. 2,540,355 a "Process for producing dustfree, readily dispersible pigment granulates", which process however is based on the use of organic solvents, the presence of which has several disadvantages: danger of explosion and fire (need to render inert), regeneration of the solvents, ecological problems, and so forth.

It has now been found that the disadvantages mentioned are avoided by using a process wherein the additive to be granulated is mixed in powder form with a granulating auxiliary which softens between 30° and 200° C., and which has a particle size of 0.1–2.0 mm, preferably 0.1–1.0 mm, and in particular 0.1–0.5 mm; and this mixture is then subjected to a gentle rotary motion, with heating from some source of heat being simultaneously applied at least until softening of the granulating auxiliary commences.

The process according to the invention is suitable for granulating difficultly fusible additives for plastics, particularly for granulating pigments and preferably organic pigments. It is however possible using the process according to the invention to granulate also other additives, for example antioxidants and light stabilisers.

The organic pigments usable according to the invention can belong to the widest variety of classes, for example to the class comprising azo, azomethine, anthraquinone, phthalocyanine, nitro, perinone, perylene, quinophthalone, dioxazine, thioindigo, iminoisoindolinone or quinacridone pigments. Metal complexes, for example of azo, azomethine or methine dyes having pigment character are also suitable. It is also possible to use carbon black, and inorganic pigments, such as $TiO_2$, iron oxide or lead chromates, and also mixtures of various pigments.

Instead of pure pigments or pigment mixtures, finished pigment preparations can also be used: these are preparations containing, in addition to the pigment, for example 20–90%, preferably between 40 and 60%, of a carrier.

The pigments are advantageously in a finely divided form, that is to say, the particle size is advantageously between 0.01 and 5μ, as is obtained for example by grinding or kneading the crude pigments, optionally in the presence of solvents and other additives, or by suitable regulation of the synthesis process. The pigments are generally employed in the form of dry powders, which however may contain residual moisture to the extent that the granulating process and the quality of the granulate produced are not impaired by it. This means as a rule that the powders can contain up to 10% of residual moisture.

Suitable granulating auxiliaries are preferably synthetic, semi-synthetic and natural resins. The synthetic or semi-synthetic resins can be polymerisation, polycondensation or polyaddition products. All resins and binders customarily used in the paint and lacquer and printing ink industries can essentially be used, such as those described for example in the paint and varnish raw materials tables of Karsten, 5th and 6th Editions, Hannover, 1972 and 1977, respectively, and/or in the book on paint resins by Wagner and Sarx, 5th Edition, Munich 1971. Also high-molecular compounds having plastics character, as are described for example in the "Kunststoff-Taschenbuch", Carl-Hanser Verlag, Munich (20th Edition 1977) can be used as granulating auxiliaries. There are preferably used those resins which do not react further chemically when exposed to air or with themselves and possibly crosslink.

All these resins can be used singly or as mixtures provided they soften between 30° and 200° C., preferably between 30° and 150° C., and particulary between 50° and 120 C.

Preferred classes of resins are:

(a) colophonium and derivatives thereof in all forms, for example hydrogenated, di- or polymerised, esterified with mono- or polyhydric alcohols, with resin formers, such as acrylic acid and butanediol or maleic acid and pentaerythritol, modified colophonium resin, calcium or zinc salts of colophonium, abietic acid and esters thereof, the soluble phenol resins modified with colophonium and resins based on acrylic compounds, as well as other natural resins, such as shellac and other copals, and also salts of rosinamine;

(b) maleic resins, oil-free alkyd resins, styrenated alkyl resins, vinyl-toluene-modified alkyd resins, alkyd resins with synthetic fatty acids, linseed oil alkyd resins, ricinenic alkyd resins, castor oil alkyd resins, soybean oil alkyd resins, coconut oil alkyd resins, tall oil and fish oil alkyd resins and acrylated alkyd resins;

(c) terpene resins and terpenephenol resins;

(d) polyvinyl resins, for example: polyvinyl acetate, polyvinyl chloride and polyvinylidene chloride, polyvinyl acetals, polyvinyl ethers, copolymers and graft copolymers with different vinyl monomers, polyacrylic acid resins, such as acrylic and methacrylic esters and their copolymers;

(e) styrene polymers and copolymers;

(f) polyolefins, for example polyethylene, polypropylene, polybutylene, polyisobutylene, polyisoprene, substituted polyolefins, halogenated polyolefins and copolymers thereof, such as ethylene and vinyl acetate copolymers and other synthetic resins based on unsaturated hydrocarbons, for example low-molecular polystyrenes, and especially the polyolefins of average degree of polymerisation, preferably having a molecular weight of 300–5000 (known as "petroresins");

(g) polyamide and polyester resins, such as linear or branched polyester resins based on phthalic acid, isophthalic acid, adipic acid or sebacic acid; and (h) coumarone, indene, coumarone-indene and ketone resins.

Further granulating auxiliaries which may be mentioned are solid plasticisers or substances similar to plasticisers, such as cycloalkyl, aryl or aralkyl esters of dicarboxylic acids, for example dicyclohexyl, diphenyl or dibenzyl esters of phthalic acid, esters of phosphoric acid, for example triphenyl phosphate, arylsulfonic acid esters of phenol and of cresol, arylcarboxylic acid esters, for example trimethylol ethane tribenzoate, as well as alkaline-earth metal salts of fatty acids having 12–24 C atoms, for example magnesium behenate and stearate, and also wax-like compounds, such as polyolefin waxes, particularly polyethylene waxes. Further suitable granulating auxiliaries are polyoxyethylene glycols and polyoxyethylene glycol ethers, polyoxyethylene-oxypropylene glycols and glycol ethers, and polyoxyethylated and/or polyoxypropylated phenols and amines.

There are advantageously used 2–50 parts, preferably 5–50 parts, and in particular 5–30 parts of the granulating auxiliary to 100 parts of the substance to be granulated.

The particle size of the granulating auxiliary is of decisive importance for the particle size of the granulate to be produced. Particle size and particlesize distribution (granulometry) of the granulate have to satisfy specific requirements depending on the field of application and on the method of incorporation. The yield of good particles is therefore important in the production of granulates. By the term 'yield of good particles' is meant the proportion of the finished granulate which consists of granulate particles of a specific range of size. Since it has proved advantageous for many plastics applications to have a particle diameter of the granulate of between 0.2 mm and 2.0 mm, the term 'yield of good particles' is to be understood in the following as meaning the proportion of the resulting granulate which has a particle diameter within this range of size, that is to say, between 0.2 and 2.0 mm. (This does not of course exclude the possibility that, for particular areas of application, granulates having other particle sizes may be applicable or even desirable. It is merely necessary in these cases to correspondingly modify the limits of particle size of the good particles.).

In order to obtain a high yield of good particles (0.2–2 mm particle diameter), it is necessary that the particle size of the granulating auxiliary be between 0.1 mm and 1.0 mm. When the particle size is smaller, no granulate is formed, and when the particle size is greater, there is formed a granulate which gives a low yield of good particles and has a high proportion of oversize particles (particle diameter 2 mm), and the proportion of oversize particles must not reach a level at which it disadvantageously influences the other properties of the granulate.

A fully satisfactory granulation can be obtained also with higher added amounts of granulating agent. It is however an advantage of the method described here that readily dispersible granulates can be produced also with smaller proportions of granulating agent, with the additional concomitant use of small amounts of dispersing agent not being excluded. Larger proportions of these auxiliaries are namely undesirable if the granulates are to be used to pigment all types of substrates which in general can absorb only a small amount of foreign substance without their physical properties being disadvantageously changed.

The process according to the invention is carried out advantageously with the use of known customary continuous and discontinuous granulating apparatus, for example the granulating drum, granulating pan, such as the EIRICH tilting pan granulator, and the dryer, for example the Conaform dryer or the eccentric tumbling dryer.

Suitable sources of heat are radiation heating, such as microwave radiation, or in particular IR radiation, or convection heating, such as jacket heating or stirringshaft heating.

The process according to the invention is advantageously performed at a temperature which is at least sufficiently high for the granulating auxiliary to commence to soften, advantageously however at temperatures which are about 5°–30° C. above that point. During heating and up to the end of the granulate forming process, a gentle rotary motion at a peripheral speed of 0.3–2.2 m/sec., preferably of 0.5–2.0 m/sec., is to be maintained.

The granulates obtained can be used for the customary applications in plastics, and exhibit the same high level of dispersibility and the same properties as are exhibited by the pulverulent additives. In contrast to these however they possess a substantially lower bulk volume, are flowable and largely dustfree, and have a relatively high mechanical strength, so that no dust is formed even after a prolonged storage time and during transport in drums.

It is obvious that such granulates are suitable also for application in other substrates, for example in lacquers and in printing inks, provided that the employed granulating auxiliaries are selected for their compatibility with these systems.

Except where otherwise stated in the following Examples, 'parts' denote parts by weight, percentages are percent by weight, and the temperature values are given in degrees Centigrade.

EXAMPLE 1

80 parts of C.I. Pigment Blue 15:3 in powder form and 20 parts of polyethylene glycol (Carbowax 4000, Union Carbide) having a particle size of 0.1–0.4 mm are homogeneously mixed in a LOEDIGE mixer. This mixture is heated in an EIRICH tilting pan granulator by means of IR-lamp heating to 100° as the granulator is being rotated (0.6 m/sec peripheral speed), and the mixture is held at this temperature for 30 minutes. After cooling to below the softening range of the granulating auxiliary, the granulate obtained is removed. The desired particle fraction (0.2–2 mm) is separated by sieving. The spherical granulate particles, obtained in high yield of good particles (79%), exhibit on incorporation, for example in soft PVC rolled sheets, the same high degree of dispersibility and the same coloristic properties as are exhibited by the pulverulent starting pigment.

EXAMPLE 2

80 parts of C.I. Pigment Yellow 110 in powder form, 10 parts of polyethylene glycol (Carbowax 4000) having a particle size of 0.1–0.4 mm, and 10 parts of magnesium stearate as dispersing agent, are homogeneously mixed in a LOEDIGE mixer. This mixture is then heated in an EIRICH tilting pan granulator by means of IR-lamp heating to 85°, as the granulator is being rotated (peripheral speed=0.6 m/sec.), and the mixture is held for 30 minutes at this temperature. The granulate obtained is subsequently processed as described in Example 1.

There is thus obtained, in high yield of good particles (74%), a pigment granulate which has the same properties as those of the granulate of Example 1.

EXAMPLE 3

80 parts of C.I. Pigment Yellow 13 in powder form, 10 parts of polyethylene glycol (Carbowax 4000) having a particle size of 0.1–0.4 mm, and 10 parts of magnesium stearate as dispersing agent, are homogeneously mixed in a LOEDIGE mixer. This mixture is then heated in an EIRICH tilting pan granulator by means of IR-lamp heating to 85° C., as the granulator is being rotated (peripheral speed=0.6 m/sec.), and the mixture is held for 20 minutes at this temperature. The granulate obtained is subsequently processed as described in Example 1.

There is obtained, in high yield of good particles (68%), a pigment granulate which has the same properties as those possessed by the granulate of Example 1.

EXAMPLE 4

80 parts of C.I. Pigment Red 144 in powder form and 20 parts of polyethylene glycol (Carbowax 20 000, Union Carbide) having a particle size of 0.2–0.5 mm are homogeneously mixed in a LOEDIGE mixer. This mixture is then heated in an EIRICH tilting pan granulator by means of IR-lamp heating to 100°, as the granulator is being rotated (peripheral speed=0.6 m/sec.), and the mixture is held for 30 minutes at this temperature. The granulate obtained is subsequently processed in the manner described in Example 1.

There is obtained, in high yield of good particles (87%), a pigment granulate which has a particle diameter of 0.2–2 mm and which on incorporation, for example into soft PVC rolled sheets, exhibits the same high degree of dispersibility and the same good coloristic properties as are exhibited by the pulverulent dusty starting pigment.

EXAMPLE 5

80 parts of C.I. Pigment Red 144 in powder form and 20 parts of hydroabietic acid (Staybelite resin, Hercules) having a particle size of 0.125–0.5 mm are homogeneously mixed in a LOEDIGE mixer. This mixture is then heated in an EIRICH tilting pan granulator by means of IR-lamp heating to 105°, with the granulator rotating at a peripheral speed of 0.6 m/sec., and the mixture is held at this temperature for 20 minutes. The granulate obtained is subsequently processed in the manner described in Example 1.

There is thus obtained, in high yield of good particles (63%), a pigment granulate which has the same properties as those exhibited by the granulates of Examples 1–4.

EXAMPLE 6

By using, instead of hydroabietic acid, the same amount of polymeric α-methyl-styrene (Kristallex 3070, Hercules) having a particle size of 0.1–1.0 mm together with the red pigment employed in Example 5, the procedure otherwise being carried out as described in Example 5 but at a temperature of 75°, there is obtained a spherical pigment granulate of equally high quality and in equally high yield of good crystals (65%).

EXAMPLE 7

If there is used the red pigment employed in Example 5 but instead of hydroabietic acid the same amount of neopentyl glycol dibenzoate (Benzoflex S-312, Velsicol International) having a particle size of 0.1–1.0 mm as the granulating auxiliary, the procedure otherwise being as described in Example 5, there is obtained a pigment granulate of high quality with a yield of good particles of 78%.

EXAMPLE 8

70 parts of C.I. Pigment Red 144 in powder form and 30 parts of polyethylene glycol (Carbowax 4000) having a particle size of 0.1–0.5 mm are homogeneously mixed in a LOEDIGE mixer. The mixture is heated in an EIRICH tilting pan granulator to 80° by means of an IR radiator, as the granulator rotates at a peripheral speed of 0.6 m/sec., and is held at this temperature for 30 minutes. The granulate obtained is processed as described in Example 1.

There is obtained a pigment granulate which has the same good properties as the granulates of the preceding Examples, the yield of good crystals being 89%.

EXAMPLE 9

80 part of C.I. Pigment Red 144 in powder form, 10 parts of polyethylene glycol (Carbowax 4000) having a particle size of 0.1–0.5 mm, and 10 parts of magnesium stearate as dispersing agent, are homogeneously mixed in a LOEDIGE mixer. This mixture is then heated in an eccentric tumbling dryer by means of jacket heating to 80°, the dryer rotating at a peripheral speed of 1 m/sec., and the mixture is held for 60 minutes at this temperature. The granulate obtained is then cooled and removed. The desired particle fraction is separated by sieving.

There is obtained a pigment granulate of a quality equally good as that of the granulates produced in the EIRICH tilting pan granulator. The yield of good crystals is 91%.

EXAMPLE 10

If the procedure is carried out as described in Example 9 except that, instead of a tumbling dryer, a Conaform dryer (likewise with jacket heating) is used, the peripheral speed being 1.4 m/sec., there is obtained a spherical pigment granulate of equally good quality and with a yield of good particles of 95%.

EXAMPLE 11

80 parts of C.I. Pigment Red 144 in powder form and 20 parts of pentaerythritol tetrastearate (pentaerythritol stearic acid ester, Hercules) having a particle size of 0.1–0.5 mm are homogeneously mixed in a LOEDIGE mixer. This mixture is then heated in an EIRICH tilting pan granulator to 85° by means of IR-lamp heating, the granulator rotating at a peripheral speed of 0.6 m/sec., and the mixture is held at this temperature for 10 minutes. The resulting granulate is further processed in the manner described in Example 1.

There is obtained, in high yield of good crystals (86%), a pigment granulate of which the properties are identical to those of Example 1–8.

EXAMPLE 12

If the procedure according to Example 11 is followed except that pentaerythritol tetrastearate having a particle size of 0.5–1.0 mm instead of 0.1–0.5 mm is used, there is obtained, in approximately the same yield of good crystals (92%), a granulate having equally good properties.

Example 13

If the procedure according to Example 11 is followed with the single exception that pentaerythritol tetrastearate having a particle size of 1–2 mm is used, the yield of good particles is only 24%. The proportion of oversize particles (particle size 2–5 mm) is 65%.

EXAMPLE 14

If the procedure is carried out as described in Example 11 with the single exception that pentaerythritol tetrastearate having a particle size of <0.1 mm is used, no granulate is formed. The granulating auxiliary is too fine.

EXAMPLE 15

95 parts of titanium dioxide in powder form (Rutil R-HD 6, Tioxide international Ltd.) and 5 parts of a vinyl copolymer (Piccotex 100, ESSO-Standard) having a particle size of 0.1–0.5 mm are homogeneously mixed in a LOEDIGE mixer. This mixture is then heated in an EIRICH tilting pan granulator to 80° by means of IR-lamp heating, the granulator rotating at a peripheral speed of 0.6 m/sec., and the mixture is held for 5 minutes at this temperature. The granulate obtained is further processed in the manner described in Example 1.

There is obtained, in a yield of good particles of 81%, a pigment granulate having properties identical to those of the granulate of Example 1.

EXAMPLE 16

70 parts of carbon black in powder form (Printex 300, DEGUSSA) and 30 parts of pentaerythritol tetrastearate having a particle size of 0.1–0.5 mm are homogeneously mixed in a LOEDIGE mixer. This mixture is then heated in an EIRICH tilting pan granulator to 100° by means of IR-lamp heating, the granulator rotating at a peripheral speed of 0.6 m/sec., and the mixture is held for 10 minutes at this temperature. The granulate obtained is further processed in the manner described in Example 1.

There is obtained, in a yield of good particles of 81%, a pigment granulate having properties identical to those of the granulate of Example 1.

EXAMPLE 17

1 part of a pigment granulate obtained according to the preceding Examples is stirred up in a mixture consisting of 65% of stabilised PVC and 35% of dioctylphthalate. The mixture is passed backwards and forwards at 140°–150° between the rollers of a calendering machine for 3 minutes. An evenly dyed sheet without any undispersed pigment agglomerates is obtained.

What is claimed is:

1. A process for producing a granulate of a difficultly fusible pigment additive for plastics by thermal tumbling granulation, which process comprises
    mixing the pigment, selected from the group consisting of azo, azomethine, anthraquinone, phthalocyanine, nitro, perinone, perylene, quinophthalone, dioxazine, thioindigo, iminoisoindolinone and quinacridone pigments, metal complexes of azo, azomethine methine dyes having pigment character, carbon black, titanium dioxide, iron oxide, lead chromates, and mixtures thereof, in powder form with a granulating auxiliary which softens between 30° and 200° C. and which has a particle size of 0.1–2.0 mm, selected from the group consisting of synthetic resins, semi-synthetic resins, natural resins, plasticizers, metal soaps and waxes, and
    subjecting this mixture to a gentle rotary motion with a peripheral speed of 0.3–2.2 m/sec, with heating by means of source of heat being simultaneously applied at least until softening of the granulating auxiliary commences.

2. A process according to claim 1, wherein granulating auxiliaries which soften between 50° and 120° C. are used.

3. A process according to claim 1, wherein the granulating auxiliary used has a particle size of 0.1–1.0 mm.

4. A process according to claim 1, wherein the granulating auxiliary used has a particle size of 0.1–0.5 mm.

5. A process according to claim 1, wherein 2–50 parts of the granulating auxiliary to 100 parts of the additive to be granulated are used.

6. A process according to claim 1, wherein 5–50 parts of the granulating auxiliary to 100 parts of the additive to be granulated are used.

7. A process according to claim 1, wherein the heat is supplied by means of convection heating.

8. A process according to claim 1, wherein the heat is supplied by means of radiation heating.

9. A process according to claim 1, wherein granulation is effected at temperatures which are 5°–30° C. above the temperature at which the granulating auxiliary commences to soften.

* * * * *

UNITED STATES PATENT AND TRADEMARK OFFICE
CERTIFICATE OF CORRECTION

PATENT NO. : 4,310,483
DATED : JANUARY 12, 1982
INVENTOR(S) : WERNER H. DORFEL ET AL

It is certified that error appears in the above—identified patent and that said Letters Patent is hereby corrected as shown below:

Claim 1, Column 8, line 19 reads:

"azomethine methine dyes having pigment charac-"

Should read:

-- azomethine and methine dyes having pigment charac- ---

Signed and Sealed this

Sixth Day of April 1982

|SEAL|

Attest:

Attesting Officer

GERALD J. MOSSINGHOFF

Commissioner of Patents and Trademarks